United States Patent [19]

Baylor

[11] Patent Number: 5,145,241
[45] Date of Patent: Sep. 8, 1992

[54] IDLER SPROCKET MOUNT FOR A CRAWLER TRACTOR

[75] Inventor: John M. Baylor, Rothschild, Wis.

[73] Assignee: Case Corporation, Racine, Wis.

[21] Appl. No.: 690,161

[22] Filed: Apr. 22, 1991

[51] Int. Cl.⁵ ............................................. B62D 55/30
[52] U.S. Cl. ...................................... 305/31; 305/10
[58] Field of Search ................ 305/10, 29, 30, 31, 305/32

[56] References Cited

U.S. PATENT DOCUMENTS

| | | | |
|---|---|---|---|
| 2,506,619 | 6/1947 | Schwartz | 305/10 |
| 2,511,098 | 5/1948 | Bridwell et al. | 305/9 |
| 2,683,064 | 3/1951 | Land | 305/9 |
| 2,887,342 | 5/1956 | Helsel, Sr. | 305/9 |
| 3,332,725 | 7/1967 | Reinsma | 305/10 |
| 3,382,013 | 7/1966 | Toth et al. | 305/30 |
| 3,841,715 | 10/1974 | Comer, Jr. et al. | 305/10 |
| 3,907,382 | 9/1975 | Kessinger, Jr. | 305/10 |
| 4,738,494 | 4/1988 | Bedis | 305/31 |
| 4,817,746 | 4/1989 | Purcell et al. | 180/9.1 |

Primary Examiner—Russell D. Stormer
Attorney, Agent, or Firm—Dressler, Goldsmith, Shore, Sutker & Milnamow, Ltd.

[57] ABSTRACT

An idler sprocket mount including a pair of modular block assemblies for mounting an idler sprocket for endwise sliding movement generally parallel to a track frame of a crawler tractor. Each block assembly defines a horizontally elongated channel allowing for endwise sliding movement of the frame therethrough to permit the idler sprocket to recoil parallel to the track frame. The elongated channel includes at least one bearing surface along which a wear surface of the track frame slides. A spring biased assembly provides a substantially constant vertically directed force against the frame to resiliently urge the wear surface against the bearing surface of the channel thereby automatically compensating for wear between the interfacing surface and inhibiting vertical bounce of the idler sprocket relative to the track frame.

11 Claims, 4 Drawing Sheets

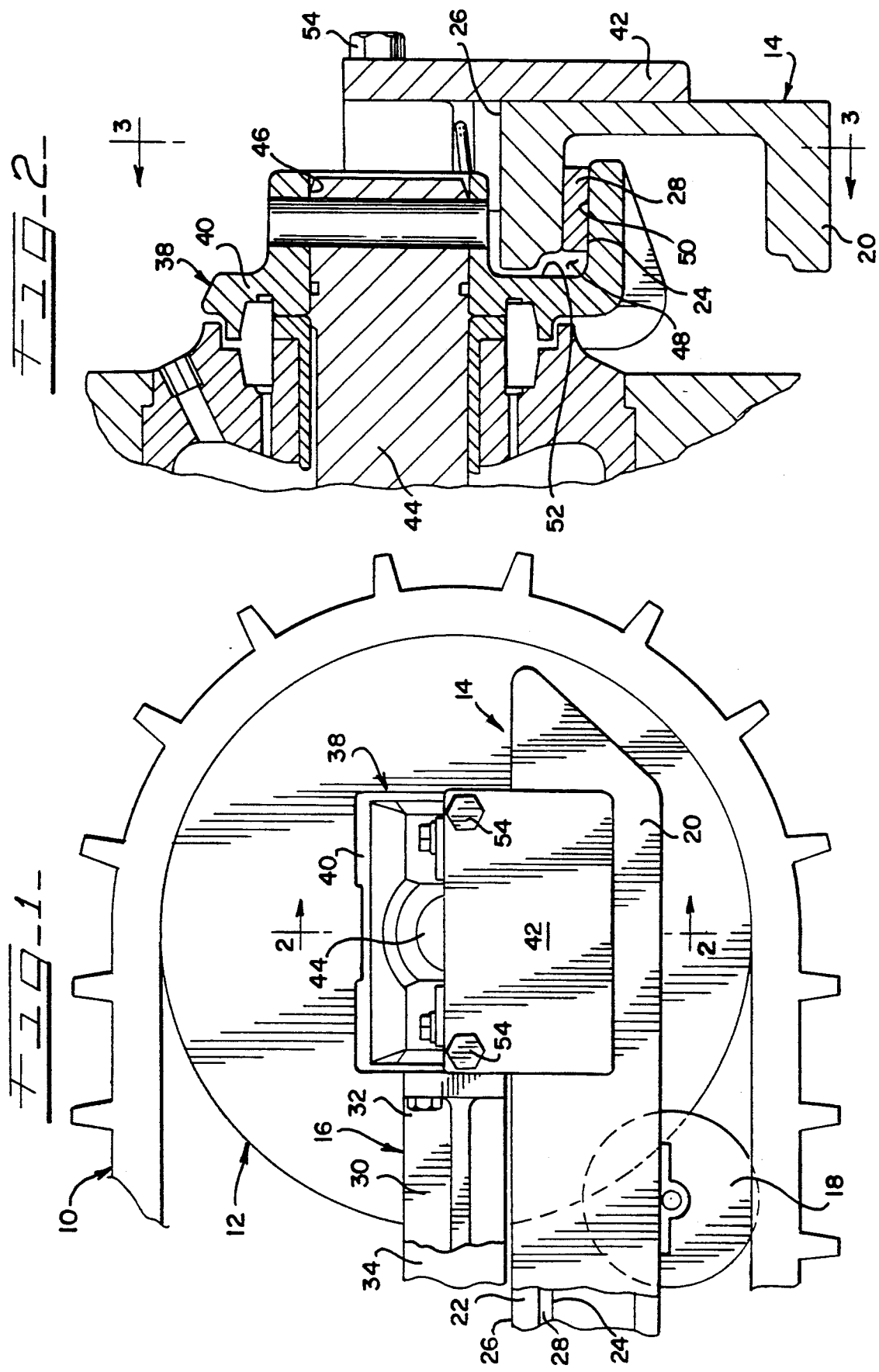

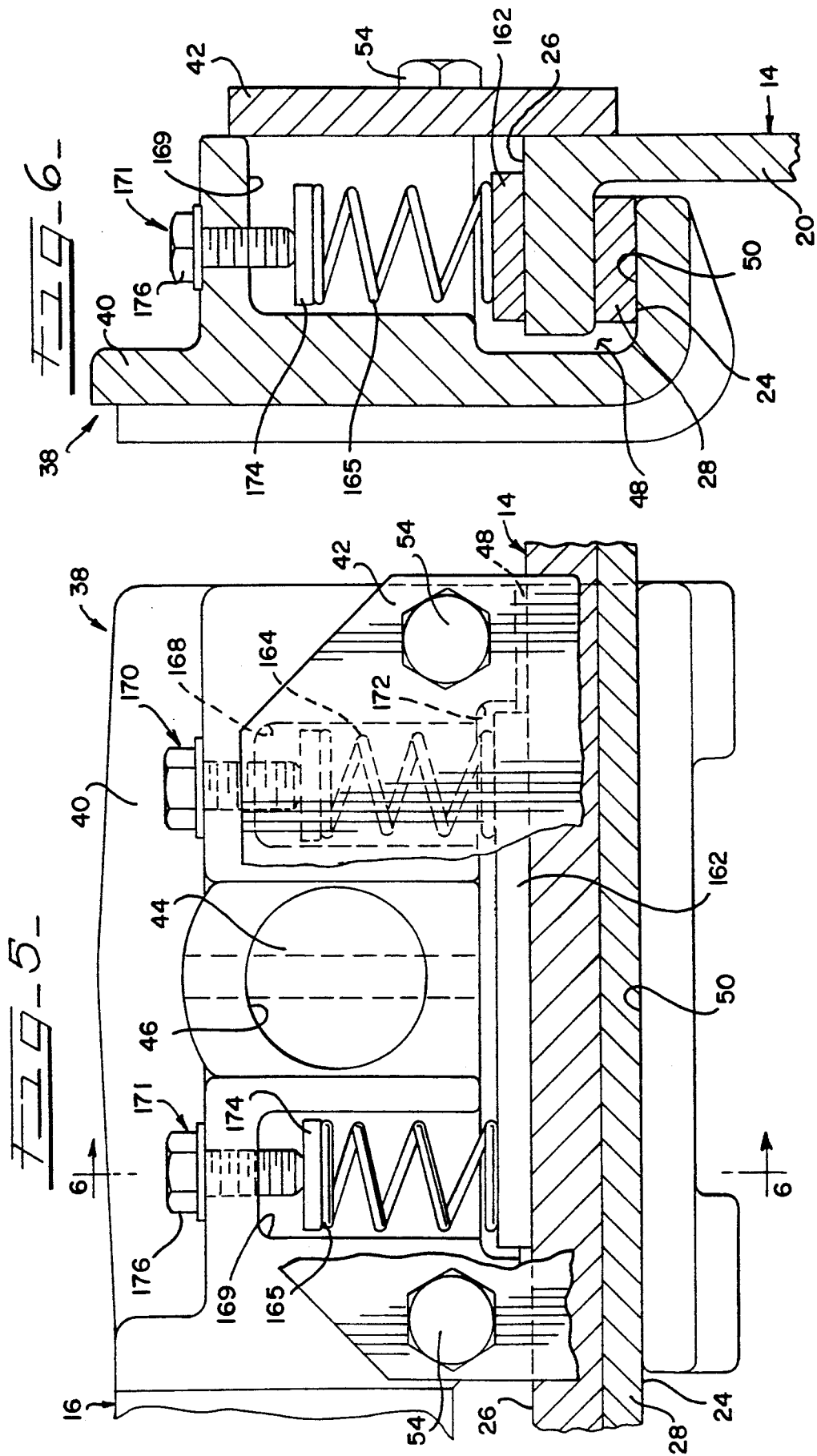

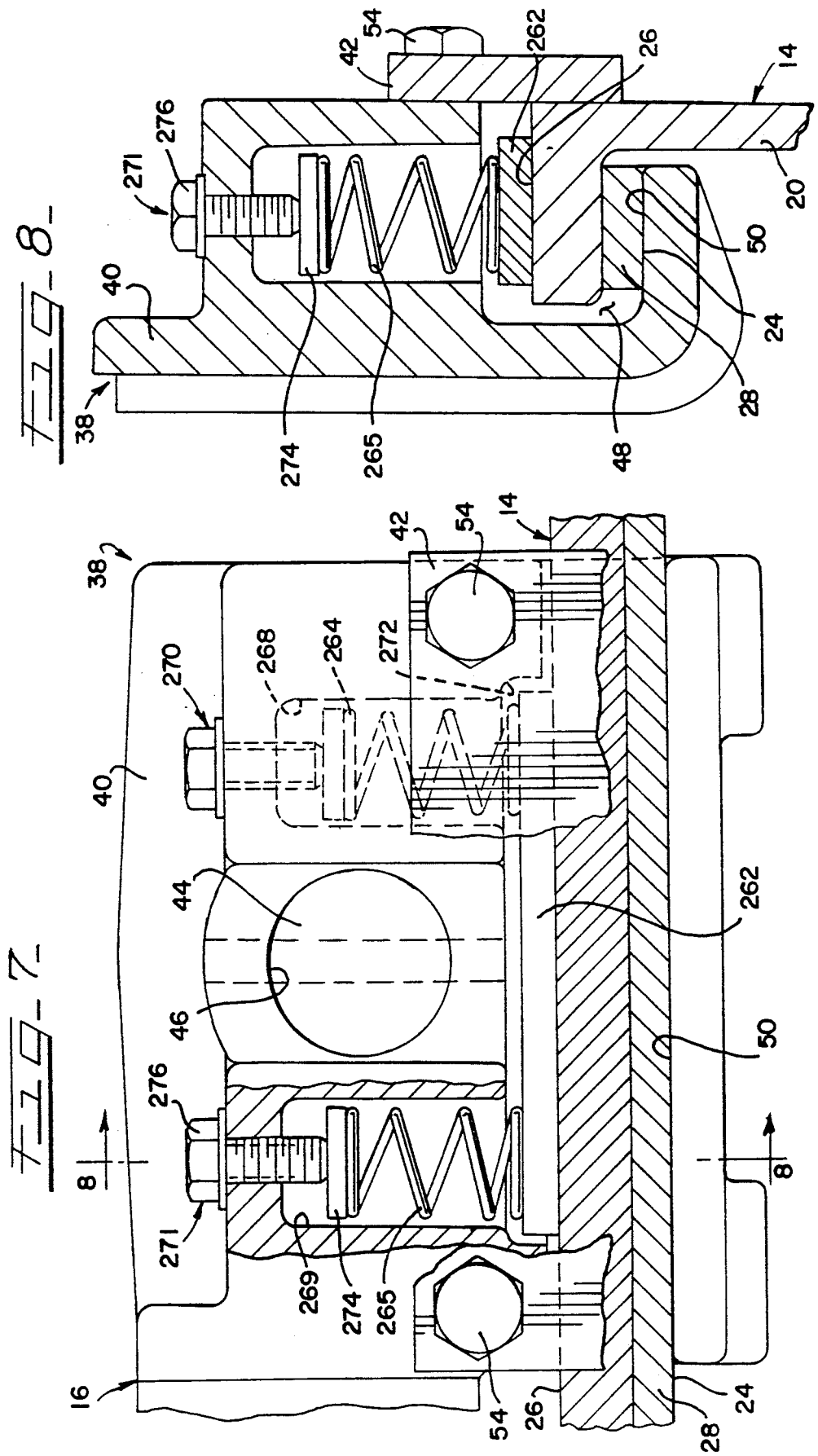

IDLER SPROCKET MOUNT FOR A CRAWLER TRACTOR

FIELD OF THE INVENTION

The present invention generally relates to crawler tractors and, more particularly, to mounting an idler sprocket to a track frame of a crawler tractor with structure permitting fore-and-aft movement and inhibiting vertical movement of the idler sprocket relative to the track frame.

BACKGROUND OF THE INVENTION

Earth-moving or crawler-type tractors are conventionally equipped with endless tracks on opposite sides of the tractor. It is customary that each endless track be trained over a driving sprocket, usually disposed to the rear of the tractor, and a forwardly disposed idler sprocket. The driving and idler sprockets are mounted on a track frame.

The idler sprocket is normally mounted to the track frame for longitudinal sliding movement relative thereto. The longitudinal sliding movement of the idler sprocket serves to maintain the track under proper tension and also allows for some measure of recoil should rocks, stones, or other foreign materials become lodged on the inside of the track. Idler sprocket mounts have typically been provided with slides and guides to facilitate the longitudinal sliding movement between the idler sprocket and the track frame.

Interfacing sliding surfaces on the idler sprocket mounts and track frame are subject to substantial wear because of relatively high shocks and stresses transmitted and imposed thereon during operation of the tractor. Moreover, grit, dirt, mud, and other abrasive foreign matter entering between the interfacing sliding surfaces on the idler sprocket mount and track frame during operation of the tractor accelerate the wear between the parts.

The amount or degree of wear in the area of sliding contact between the idler sprocket mount and track frame is proportional to the vertical movement or bounce of the idler sprocket relative to the frame. Of course, vibration or bounce of the idler sprocket exacerbates the wear problem between the parts. Vertical vibrations or bounce of the idler sprocket furthermore generates noise and causes operational control problems including coarseness of the ride and steering problems which hinder or limit tractor ground speed.

It is desirable, therefore, to eliminate vertical movement of the idler sprocket relative to the frame. One method of accomplishing this end is to replace the worn parts. As will be appreciated, however, replacement of the parts is costly besides the considerable time that must be expended to disassemble and reassemble the idler sprocket mounts. Moreover, changing the worn parts is difficult to accomplish in the field and requires an inventory of replacement parts.

Alternatively, shims are used to compensate for the increased vertical clearance resulting from wear between interfacing sliding surfaces on the parts. Shims are conventionally secured in place by bolts received in slots provided on the idler sprocket mounts. Ice, mud, rocks, and other material which accumulate on the tractor frame add to the frustration of mounting the shims in place to compensate for wear between the parts. Moreover, the use of shims is subject to error because of the human factor involved.

Using shims to eliminate vertical vibrations of the idler sprocket is also expensive due to the drilling and tapping procedure for the shims. Some consider this approach uneconomical in that the shims must be thick enough such that the threaded holes for the bolts, used to secure the shims in place, must be vertically removed in relation to the wear surface of the shim. As will be appreciated, a bolt passing through the wear surface of the shim will accelerate the wear between the interfacing sliding surfaces. Thus, additional time needs to be expended during maintenance to assure that the shims, spacers, or the like do not require replacement themselves.

U.S. Pat. No. 3,907,382 assigned to Caterpillar Tractor Co. represents still another alternative for inhibiting vertical bounce of the idler sprocket relative to the track frame. As illustrated, a series of fluid actuated pistons affect the disposition of interfacing wear surfaces on the idler sprocket mount and the track frame relative to each other. Each piston is arranged for reciprocal endwise movement within a normally closed fluid chamber. Fluid is introduced into the chamber and behind the piston through a fitting.

An inherent characteristic of fluids is that they are incompressible. Moreover, during tractor operation, the rough terrain over which the tractor moves inherently imparts relatively high impact forces between the idler sprocket mount and the track frame. Such relatively high impact forces are likewise transmitted and tend to vertically move the pistons into the closed fluid chamber.

Upward movement of the pistons against the incompressible fluid prompts fluid leaks in the system. As will be appreciated, fluid leaks are an inherent problem with any fluid system. Moreover, and because the fluid is normally entrapped within a closed chamber, only limited pressure can be applied to the pistons by the incompressible fluid. Wear between the parts and fluid leaks resulting in loss of fluid from the closed chamber significantly reduces the fluid pressure applied to the pistons thereby adversely effecting the ability of the pistons to inhibit vertical bounce of the idler sprocket. Fluid leakage problems along with limited pressure characteristics furthermore requires regular maintenance for such a system.

Thus, there is a need and a desire for an idler sprocket mount that allows for sliding longitudinal movement of the idler sprocket and automatically compensates for wear between interfacing sliding surfaces thereby reducing noise and vibrations and overall handling characteristics of the tractor.

SUMMARY OF THE INVENTION

In view of the above, and in accordance with the present invention, there is provided a pair of modular block assemblies arranged on opposite sides of an idler sprocket for mounting the sprocket for endwise sliding movement generally parallel to a track frame of a crawler tractor. A salient feature of the present invention relates to the ability of each block assembly to apply a substantially constant vertically directed pressure against the track frame thereby automatically compensating for wear between interfacing surfaces on the block assembly and track frame. Another salient feature of the present invention concerns modularization of each bearing assembly to facilitate assembly of the idler sprocket to the track frame.

An exemplary embodiment of the invention has the pair of modular block assemblies secured to a recoil assembly mounted on the track frame. Each idler block assembly supports one end of a shaft about which the idler sprocket rotates. A horizontally elongated channel defined by each block assembly accommodates first and second horizontal and generally parallel wear surfaces on the track frame in a manner permitting the idler sprocket to recoil parallel to the frame while inhibiting lateral movement of the track frame relative to a respective block assembly.

The channel defined by each block assembly has at least one horizontal bearing surface which interfaces with a first wear surface on the frame to facilitate endwise sliding movement between the frame and the block assembly. Each modular block assembly further includes a resiliently biased assembly for automatically compensating for wear between the interfacing surfaces on the block assembly and track frame. The resiliently biased assembly applies a substantially constant vertically directed force against a second wear surface on the frame thereby affecting the disposition of the first wear surface relative to the bearing surface on the block assembly and inhibiting vertical bounce of the idler sprocket relative to the track frame.

In a preferred form of the invention, each modular block assembly includes a unitary mounting block structure defining a horizontally elongated channel and a bore extending generally normal to the channel for receiving a shaft about which the idler rotates. To avoid costly machining procedures, the block structure preferably has spring receiving cavities cast or otherwise formed therein on opposite sides of the bore.

The resiliently biased assembly of each block assembly is designed according to the vertical space constraints of the particular block assembly. In one form, separate wear plates are arranged on opposite sides of the bore in the mounting block. Each wear plate is biased against the frame by a spring structure which is axially compressible within one of the spring chambers formed in the mounting block. In another form of the invention, an elongated wear plate is pressed against the frame by springs acting against opposite ends of the wear plate. The springs are axially compressible within the spring chambers formed on the mounting block. Preferably, a regulator mechanism is provided for axially and adjustably compressing the spring within the spring chamber.

A clamp mechanism secured to the block structure entraps the frame within the channel for endwise sliding movement while inhibiting lateral movement of the frame relative to the block assembly. The clamp structure furthermore inhibits dust, dirt, and other foreign matter from interfering with proper spring operation.

The ability of the idler sprocket mount of the present invention to automatically compensate for wear between the sliding parts requires minimal activity on the part of the operator and substantially eliminates human error during maintenance procedures or operations. Moreover, the ability of the idler sprocket mount of the present invention to automatically compensate for wear between the sliding parts substantially eliminates vertical bounce of the idler sprocket relative to the frame thereby improving smoothness of the ride, a reduction in noise levels during tractor operation, and enhances handling characteristics of the tractor. The modularity of the idler sprocket mount of the present invention provides an effective use of materials and facilitates assembly of the mount to the track frame. Providing a unitary mounting block structure furthermore minimizes machining operations and thereby provides a relatively inexpensive mount for an idler sprocket of a crawler tractor.

Numerous other features and advantages of the present invention will become readily apparent from the following detailed description, the accompanying drawings, and the appended claims.

BRIEF DESCRIPTION OF THE DRAWINGS

FIG. 1 is a schematic side elevational view of an idler sprocket and mount therefor arranged on a track frame for endwise slidable movement therealong;

FIG. 2 is a vertical sectional view taken along line 2—2 of FIG. 1;

FIG. 5 is a fragmentary side elevational view similar to FIG. 3 illustrating a second embodiment of an idler, sprocket block assembly according to the present invention;

FIG. 6 is an end view of the idler block assembly illustrated in FIG. 5;

FIG. 7 is a fragmentary illustration of another embodiment of the idler sprocket block assembly according to the present invention; and FIG. 8 is an end view of the idler sprocket block assembly illustrated in FIG. 7.

DETAILED DESCRIPTION OF THE INVENTION

Figure 3:
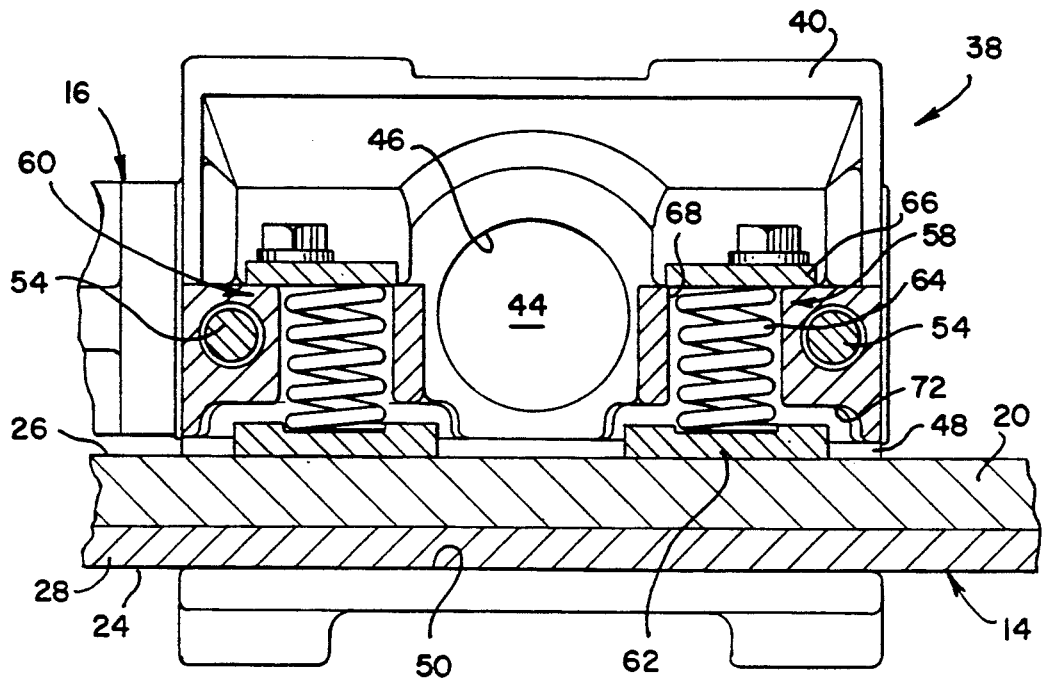
FIG. 3 is a side sectional view of one embodiment of the present invention taken along line 3—3 of FIG. 2.

While the present invention is susceptible of embodiment in various forms, there is shown in the drawings and will hereinafter be described presently preferred embodiments of the invention, with the understanding that the present disclosure is to be considered as setting forth exemplifications of the invention which are not intended to limit the invention to the specific embodiments illustrated.

Referring now to the drawings, wherein like reference numerals indicate like parts throughout the several views, there is a fragmentary schematic illustration of a portion of a track mechanism for a track-type crawler tractor. As shown, the track mechanism includes an endless track 10 trained about an idler sprocket 12 mounted on a track frame 14. The track mechanism further includes a recoil assembly 16 and a series of rollers 18 secured to the track frame 14.

The track frame 14 is mounted to the tractor in a conventional manner. The track frame 14 has a bifurcated end section including a pair of spaced beams 20 and 22 which sandwich the idler sprocket 12 therebetween. As shown, each beam 20, 22 of frame 14 has a first horizontal wear surface 24 and a second horizontal wear surface 26. Wear surfaces 24 and 26 are vertically spaced from and extend generally parallel to each other. In the preferred embodiment, a wear strip 28 is bolted or otherwise releasably secured to each beam of frame 14 and defines wear surface 24.

The recoil assembly 16 is mounted to the frame to apply tension to the track 10 and enhance good driving engagement with the sprocket 12. Recoil assembly 16 furthermore allows the idler sprocket 12 to recoil and relieve tension on the track 10 to a limited degree in the event that a rock or other hard object is entrapped on the inside of the track 10. In the illustrated embodiment, recoil assembly 16 includes a resiliently biased yoke 30 including a pair of legs 32 and 34. Legs 32, 34 extend generally parallel to the frame 14 and have the idler sprocket 12 mounted therebetween.

According to the present invention, a pair of idler sprocket block assemblies 38 are secured to the distal ends of legs 32, 34 of the recoil assembly 16 for mounting the idler sprocket 12 on the track frame 14. Each idler sprocket block assembly is the mirror image of the other and, therefore, only one block assembly will be described in detail with the understanding that the other block assembly is similarly structured.

As shown in FIGS. 1 and 2, each idler block assembly is comprised of a unitary block structure 40 which is preferably formed from a one-piece casting or the like and has a clamp or guide plate 42 secured thereto. Each idler block assembly supports one end of a shaft 44 about which the idler sprocket 12 rotates.

As shown in FIGS. 2 and 3, each block structure 40 defines a bore 46 which supports one end of the shaft 44 and an open-sided, horizontally elongated channel 48. Channel 48 extends parallel to and slidably accommodates the first and second horizontal wear surfaces 24, 26 of a respective beam of track frame 14.

In the preferred embodiment, channel 48 extends along and from a surface of the block structure 40 laterally remote from the idler sprocket 12. The channel 48 of each block structure 40 includes an upwardly facing and hardened horizontal bearing surface 50 along which wear surface 24 of track frame 14 slides to permit the idler sprocket 12 to recoil parallel to the frame 14. Adjacent bearing surface 50, block structure 40 defines a vertically extending surface 52.

Figure 4:
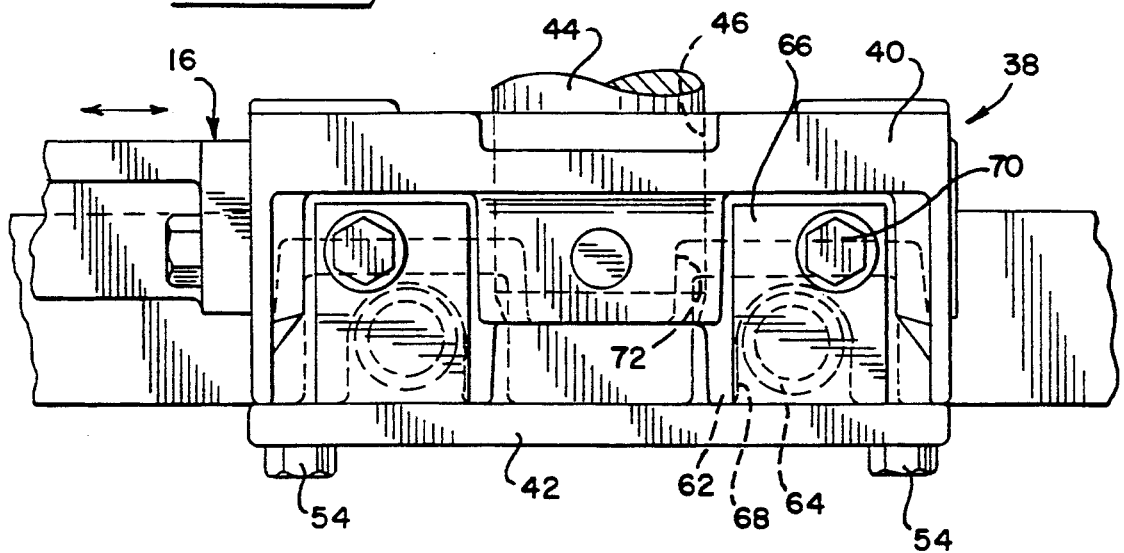
FIG. 4 is a plan view of the idler block assembly illustrated in FIG. 3 and secured to a track frame for endwise sliding movement.

As shown in FIGS. 2 and 4, clamp plate 42 depends from and is secured to the unitary mounting block structure 40 as with bolts 54. Clamping plate 42 combines with vertical surface 52 of channel 48 to inhibit lateral movement of the track frame 14 relative to the channel 48.

To inhibit vertical movement or bounce of the idler sprocket 12, each modular block assembly 38 further includes, as an integral part thereof, a spring biased assembly. The purpose of the spring biased assembly is to apply a generally vertically directed force against the frame 14 in a manner inhibiting vertical movement of the idler sprocket 12 relative to the track frame 14.

During tractor operation, each spring biased assembly exerts about a 200 lb. to about a 1200 lb. vertically directed force against the frame 14. As will be appreciated, the amount or level of the vertically directed force will depend upon a number of factors including the particular tractor with which the present invention is utilized. In those instances where vertical movement of the idler sprocket 12 relative to the frame 14 is unavoidable, the spring biased assembly on each block assembly provides a dampening effect to the forces transmitted to the frame 14.

As will be appreciated by those skilled in the art, vertical space constraints associated with a particular idler sprocket block assembly design likewise influences the design of the spring biased assembly. In the embodiment illustrated in FIGS. 3 and 4, each spring biased assembly includes individual pressure applying mechanisms 58 and 60. Because the pressure applying mechanisms 58 and 60 are substantially identical, only pressure applying mechanism 58 will be described in detail with the understanding that pressure applying mechanism 60 is structured substantially similar thereto.

In the illustrated embodiment, each pressure applying mechanism is arranged to one side of the bore 46 and includes a wear plate 62, a spring 64, and a cap 66. As shown, the wear plate 62 is resiliently urged against wear surface 26 of the track frame with sufficient force to inhibit relative vertical movement between wear surface 24 of track frame 14 and bearing surface 50 of block assembly 38. To effect such ends, each spring 64 is mounted and is axially compressible within an open-sided spring chamber 68 defined by the unitary mounting block structure 40. Spring chamber 68 opens to the same surface on mounting block structure 40 as does channel 48. The clamp or guide plate 42 is attached to the mounting block structure 40 in a manner closing the open side of spring chamber 68 and inhibiting contaminants from interfering with proper operation of the spring 64. Each cap 66 is arranged over a respective spring 64, and a bolt 70, threaded into the unitary block structure 40, causes the cap 66 to axially compress the spring 64 in the chamber 68 thereby applying a vertically directed force to the plate 62 and thereby against the frame 14 in a manner inhibiting relative vertical movement between the frame 14 and the block assembly 38.

As shown, the unitary block structure 40 is suitably configured with recess 72 that accommodates and inhibits shifting of a respective wear plate 62 as the frame 14 endwise moves through the channel 48 relative to the block assembly 38. Accordingly, no additional bolts or screws are required to limit the horizontal movement of plate 6 when the track frame 14 horizontally moves relative to a respective block assembly.

A second embodiment of a spring biased assembly is schematically illustrated in FIGS. 5 and 6. The structural elements which are common between FIGS. 1 through 4 and FIGS. 5 and 6 are designated by the same reference numerals. Moreover, the disclosure of the relation and function of the structural elements as discussed above with respect to FIGS. 1 through 4 are incorporated by reference with regard to FIGS. 5 and 6 and will not be herein repeated.

As shown in FIGS. 5 and 6, the alternative spring based assembly includes a horizontally elongated wear plate 162 which is accommodated within a recess 172 defined by the unitary block structure 40. Recess 172 is configured to inhibit horizontal shifting of the wear plate 162 as the frame 14 endwise moves within the channel 48 relative to the block assembly 38. In this second embodiment, a pair of springs 164 and 165, arranged on opposite sides of bore 46, resiliently urge opposite ends of the wear plate 162 against wear surface 26 of the frame 14. The springs 164 and 165 combine to apply a substantial and vertically directed force against the frame 14 in a manner inhibiting bouncing of the frame 14 within the channel 48.

To facilitate assembly of the spring biased assembly, the springs 164 and 165 are accommodated within open-sided and blind spring chambers 168 and 169 defined by the unitary block structure 40. Clamp plate 42 is configured to cover each open-sided spring chamber 168 and 169 to inhibit contaminants from interfering with proper operation of the springs 164 and 165.

In this second embodiment, the magnitude of the vertically directed force applied by springs 164 and 165 is adjustable by means of regulators 170 and 171, respectively. The regulators 170 and 171 are substantially similar and therefore the description of regulator 171 will suffice for an understanding of each regulator.

Each regulator includes a plate 174 and suitable means for axially compressing the respective spring within its chamber. As shown, plate 174 covers a respective spring and is vertically movable within the respective spring chamber. A bolt 176 is threadably secured for endwise vertical adjustment within the block structure 40 and serves to press against plate 174. As will be appreciated, vertical adjustment of the bolt 176 will effect axial compression of a respective spring thereby regulating the vertically directed force inhibiting the frame 14 from vertical movement relative to the block assembly and thereby inhibiting bounce of the idler sprocket 12 (FIG. 1).

A third embodiment of a spring biased assembly is schematically illustrated in FIGS. 7 and 8. The structural elements which are common between FIGS. 1 through 4 and FIGS. 7 and 8 are designated by the same reference numerals. Moreover, the disclosure of the relation and function of the structural elements as discussed above with respect to FIGS. 1 through 4 are incorporated by reference with regard to FIGS. 7 and 8 will not be repeated herein.

As shown in FIGS. 7 and 8, the alternative spring biased assembly includes a horizontally elongated wear plate 262 which is accommodated within a recess 272 defined by the block structure 40. Recess 272 is configured to inhibit shifting of the wear plate 262 as the frame 14 endwise moves within the channel 48 relative to the block assembly. The wear plate 262 is vertically biased toward the frame under the influence of springs 264 and 265. The springs 264, 265 are arranged on opposite sides of the bore 46 and are axially compressible within blind spring chambers 268, 269, respectively, defined by the unitary block structure 40.

In this third embodiment, the magnitude of the vertically directed force supplied by springs 264, 265 is adjustable by means of regulators 270 and 271, respectively. The regulators 270 and 271 are substantially similar Therefore, a description of regulator 271 will suffice for an understanding of each regulator.

Each regulator includes a plate 274 and suitable means for axially compressing the respective spring within its chamber. As shown, plate 274 covers a respective spring and is vertically movable within a spring chamber. A bolt 276 is threadably secured for endwise adjustment within the block structure 40 and serves to press against plate 274. As will be appreciated, vertical adjustment of the bolt 276 will effect axial compression of a respective spring thereby regulating the vertically directed force inhibiting the frame from vertical movement relative to the block assembly and thereby inhibiting bounce of the idler sprocket 12.

As will be appreciated, the unitary structure of the block structure 40 economizes on space and provides an efficient use of materials. Moreover, the modularity of the each block assembly 38 facilitates assembly of the idler sprocket 12 to the frame 14. With the present invention, each modular assembly 38 readily slides onto the track frame 14 such that the first and second wear surfaces 24 and 26, respectively, are accommodated within the channel 48 of a respective block assembly. After securing the clamp plate 42 to the unitary block structure 40, the idler sprocket 12 is limited to endwise movement parallel to the frame 14 under the influence of the recoil assembly 16 and is inhibited from lateral movement relative thereto. Because of the modularity of each block assembly, there are no loose shims to contend with or lose during assembly of the block assembly.

Because of the environment in which the present invention finds utility, wear between the interfacing surfaces on the parts is inevitable. With the present invention, however, wear between the interfacing surfaces is automatically compensated for and requires substantially no activity on the part of the operator to compensate for such wear. As will be appreciated, the spring biased assembly of each idler sprocket block assembly automatically compensates for the wear between interfacing surfaces and continually urges wear surface 24 on frame 14 into contact with the bearing surface 50 on the block assembly 38 to inhibit vertical movement of the idler sprocket 12. Automatic compensation for wear provides a smoother ride and better handling characteristics for the tractor.

In a preferred form of the invention, each spring biased assembly includes means for regulating the vertically directed force applied to the frame 14. In those instances where vertical movement of the idler sprocket 12 relative to the frame 14 is unavoidable, the spring biased assembly of each idler sprocket block assembly provides a dampening effect to the forces transmitted to the frame 14.

From the foregoing, it will be observed that numerous modifications and variations can be effected without departing from the true spirit and scope of the novel concept of the present invention. It will be appreciated that the present disclosure is intended to disclose exemplifications of the invention, and is not intended to limit the invention to the specific embodiments illustrated. The disclosure is intended to cover by the appended claims all such modifications as fall within the scope of the claims.

What is claimed is:

1. An idler sprocket mount for a crawler tractor operable over uneven terrain conditions and having a track frame with a bifurcated end section, an idler sprocket recoil assembly including a yoke for exerting a tensioning force against an endless track and having a pair of spaced legs extending generally parallel to the frame, an idler sprocket mounted between said legs and the bifurcated end section of said track frame, said idler sprocket mount comprising:

a pair of idler sprocket block assemblies secured to said pair of legs of the recoil assembly yoke for mounting the idler sprocket on the track frame, each idler sprocket block assembly comprising a unitary block structure defining a bore which supports a shaft about which the idler sprocket rotates and a horizontally elongated open sided channel including at least one bearing surface along which a first wear surface of said frame endwise slides to permit the idler sprocket to recoil parallel to the frame, clamp means secured to said block structure for inhibiting lateral movement of said frame relative to said block structure, and resiliently biased means including compressible spring structure carried by each block structure for applying a vertically directed force against a second wear surface on said frame to maintain engagement between the bearing surface of said channel and said first bearing surface of said frame thereby inhibiting relative vertical movement between a respective block assembly and the track frame and for dampening impact forces applied to said frame as said sprocket forcibly moves as the tractor moves over the uneven terrain.

2. An idler sprocket mount for a crawler tractor having a track frame with a bifurcated end section, an idler sprocket recoil assembly including a yoke for exerting a tensioning force against an endless track and having a pair of spaced legs extending generally parallel to the frame, an idler sprocket mounted between said legs and the bifurcated end section of said track frame, said idler sprocket mount comprising:

a pair of idler sprocket block assemblies secured to said pair of legs of the recoil assembly yoke for mounting the idler sprocket on the track frame, each idler sprocket block assembly comprising a unitary block structure defining a bore which supports a shaft about which the idler sprocket rotates and a horizontally elongated open sided channel including at least one bearing surface along which a first wear surface of said frame endwise slides to permit the idler sprocket to recoil parallel to the frame, clamp means secured to said block structure for inhibiting lateral movement of said frame relative to said block structure, and resiliently biased means including a wear plate slidably engagable with a second wear surface on said track frame and spring structure axially compressible within a chamber defined by said unitary mounting block for urging said wear plate toward said second wear surface whereby applying a vertically directed force against said frame to maintain engagement between the bearing surface of said channel and said first bearing surface of said frame thereby inhibiting relative vertical movement between a respective block assembly and the track frame.

3. The idler sprocket mount according to claim 2 wherein said resiliently biased means further includes a cap structure secured to said mounting block for compressing the spring structure.

4. An idler sprocket mount for a crawler tractor having a track frame with a bifurcated end section, an idler sprocket recoil assembly on the track frame including a pair of legs, an idler sprocket mounted between said legs and the bifurcated end section of said frame, said idler sprocket mount comprising:

a pair of idler sprocket block assemblies secured to said pair of legs of the recoil assembly for mounting the idler sprocket on the track frame, each idler block assembly supporting one end of a shaft about which said idler sprocket rotates and defining a horizontally elongated channel allowing for endwise sliding movement of the frame therethrough to permit the idler sprocket to recoil parallel to the frame, said channel including at least one bearing surface along which a first wear surface of said track frame slides, each block assembly further including axially compressible spring structure carried within one or more spring receiving cavities defined by each idler block assembly, said compressible spring structure providing a substantially constant vertically directed force against said frame to resiliently urge the wear surface of said track frame against said bearing surface of the channel thereby automatically compensating for wear between said surfaces and inhibiting relative vertical movement between said block assembly and track frame.

5. An idler sprocket mount for a crawler tractor having a track frame with a bifurcated end section, an idler sprocket recoil assembly on the track frame including a pair of legs, an idler sprocket mounted between said legs and the bifurcated end section of said frame, said idler sprocket mount comprising:

a pair of idler sprocket block assemblies secured to said pair of legs of the recoil assembly for mounting the idler sprocket on the track frame, each idler block assembly supporting one end of a shaft about which said idler sprocket rotates and defining a horizontally elongated channel allowing for endwise sliding movement of the frame therethrough to permit the idler sprocket to recoil parallel to the frame, said channel including at least one bearing surface along which a first wear surface of said track frame slides, each block assembly including a unitary block structure defining said horizontally elongated channel and a bore extending generally normal to the channel for receiving said shaft, said unitary block structure defining horizontally spaced spring chambers on opposite sides of said bore for accommodating and arranging springs for providing a substantially constant vertically directed force against said frame to resiliently urge the wear surface of said track frame against said bearing surface of the channel thereby automatically compensating for wear between said surfaces and inhibiting relative vertical movement between said block assembly and track frame.

6. The idler sprocket mount according to claim 5 wherein each block assembly further includes at least one wear plate resiliently urged against a second wear surface on said frame by said springs to inhibit relative vertical movement between said block assemblies and the track frame.

7. An idler sprocket mount for a crawler tractor having a fore-and-aft extending frame with a bifurcated end section, an idler sprocket recoil assembly mounted on the track frame including a pair of legs, which extend parallel to the track frame, an idler sprocket mounted between said legs and the bifurcated end section of said frame, said idler sprocket mount comprising:

a pair of idler sprocket block assemblies secured to distal ends of said pair of legs of the recoil assembly for mounting the idler sprocket on the track frame, each idler sprocket block assembly including a unitary block structure defining a bore which supports a shaft about which the idler sprocket rotates and a channel extending along and from a surface of the block structure laterally remote from the idler sprocket and accommodating first and second horizontally extending and generally parallel surfaces of said track frame, said first surface of said track frame being supported by and slidable along a horizontal bearing surface defined by said channel thereby allowing the idler sprocket to move parallel to the frame, each block assembly further including limit means for inhibiting excessive lateral movement between the track frame and each block assembly and axially compressible spring structure carried by the block structure of each block assembly for applying a substantially constant vertically directed force against said second surface of said frame to oppose vertical movement of the first surface away from the bearing surface of said channel thereby cushioning vertical impact forces between the idler sprocket and frame by inhibiting relative vertical movement between the idler sprocket and track frame.

8. The idler sprocket mount according to claim 7 wherein each idler sprocket block assembly further includes adjustable means threadably engaged with a respective block structure for adjusting the axial compression of said spring structure thereby regulating the vertically directed force applied against said frame by said spring structure.

9. An idler sprocket mount for a crawler tractor having a fore-and-aft extending frame with a bifurcated end section, an idler sprocket recoil assembly mounted on the track frame including a pair of legs, which extend parallel to the track frame, an idler sprocket mounted between said legs and the bifurcated end section of said frame, said idler sprocket mount comprising:

a pair of idler sprocket block assemblies secured to distal ends of said pair of legs of the recoil assembly for mounting the idler sprocket on the track frame, each idler sprocket block assembly including a unitary block structure defining a bore which supports a shaft about which the idler sprocket rotates and a channel extending along and from a surface of the block structure laterally remote from the idler sprocket and accommodating first and second horizontally extending and generally parallel surfaces of said track frame, said first surface of said track frame being supported by and slidable along a horizontal bearing surface defined by said channel thereby allowing the idler sprocket to move parallel to the frame, each block assembly further including means for inhibiting excessive lateral movement between the track frame and each block assembly, wherein said unitary block structure further defines horizontally spaced spring chambers for accommodating axially compressible springs therewithin and a wear plate which is biased against said track frame by said springs for applying a substantially constant vertically directed force against said second surface of said frame to oppose vertical movement of the first surface away from the bearing surface of said channel thereby inhibiting relative vertical movement between the idler sprocket and track frame.

10. The idler sprocket mount according to claim 9 wherein said spring chambers open to the surface of the block structure laterally remote from the idler sprocket to facilitate assembly of the idler sprocket block assembly, and with said inhibiting means being configured to close the open side of said chambers to inhibit contaminants from interfering with spring operation.

11. The sprocket mount according to claim 9 wherein said spring chambers are formed as blind bores which accommodate said springs therewithin.

* * * * *